(12) United States Patent
Shapiro et al.

(10) Patent No.: US 10,609,212 B2
(45) Date of Patent: Mar. 31, 2020

(54) SYSTEM, METHOD, AND COMPUTER PROGRAM PRODUCT FOR CALL TRACKING USING CALLER IDENTIFICATION IN CROSS-CHANNEL MARKETING AUTOMATION MANAGEMENT SUPPORT WITH INTELLIGENT PRIVACY PROTECTION

(71) Applicant: DIALOGTECH INC., Chicago, IL (US)

(72) Inventors: Irvin M. Shapiro, Chicago, IL (US); Shannon M. Price, Chicago, IL (US)

(73) Assignee: DIALOGTECH INC., IL (US)

( * ) Notice: Subject to any disclaimer, the term of this patent is extended or adjusted under 35 U.S.C. 154(b) by 0 days.

(21) Appl. No.: 15/464,867

(22) Filed: Mar. 21, 2017

(65) Prior Publication Data

US 2017/0272569 A1    Sep. 21, 2017

Related U.S. Application Data

(60) Provisional application No. 62/311,090, filed on Mar. 21, 2016.

(51) Int. Cl.
*H04M 3/42* (2006.01)
*G06Q 30/02* (2012.01)
(Continued)

(52) U.S. Cl.
CPC .... *H04M 3/42008* (2013.01); *G06F 21/6254* (2013.01); *G06Q 30/02* (2013.01); *G06Q 30/0267* (2013.01); *G06Q 30/0273* (2013.01); *H04L 9/0643* (2013.01); *H04L 63/0407* (2013.01); *H04L 63/0428* (2013.01); *H04L 67/20* (2013.01); *H04L 67/22* (2013.01); *H04L 63/0421* (2013.01); *H04L 67/146* (2013.01); *H04L 67/42* (2013.01); *H04M 3/42059* (2013.01); *H04M 3/42102* (2013.01); *H04M 3/42357* (2013.01); *H04M 3/4878* (2013.01); *H04M 2203/551* (2013.01); *H04M 2203/558* (2013.01); *H04M 2203/6009* (2013.01)

(58) Field of Classification Search
CPC ......... H04M 3/42008; H04M 3/42059; H04M 3/42102; H04M 3/42357; H04M 2203/551; H04M 2203/558; H04M 2203/6009; H04M 3/4878; G06Q 30/0267; G06Q 30/0273; G06Q 30/02; H04L 9/0643; H04L 63/0428; H04L 67/146; H04L 67/20; H04L 67/22; H04L 67/42; H04L 63/0407; H04L 63/0421; G06F 21/6254
USPC ....................................... 379/201.11
See application file for complete search history.

(56) References Cited

U.S. PATENT DOCUMENTS 6,553,110 B1 *  4/2003  Peng ................. H04M 1/57
                                            379/142.02
9,699,311 B2 *  7/2017  Shapiro ............ H04M 3/5191
(Continued)

OTHER PUBLICATIONS

European Search Report for corresponding EP 17 16 2027 dated Dec. 7, 2017.

*Primary Examiner* — Harry S Hong
(74) *Attorney, Agent, or Firm* — Barnes & Thornburg LLP

(57) ABSTRACT

A system, methods, and computer program products for performing call tracking in a novel way wherein caller ID data is obfuscated so as to preserve a caller's privacy by protecting their telephone number.

20 Claims, 3 Drawing Sheets

(51) Int. Cl.
*H04L 29/06* (2006.01)
*H04L 29/08* (2006.01)
*H04L 9/06* (2006.01)
*G06F 21/62* (2013.01)
*H04M 3/487* (2006.01)

(56) References Cited

U.S. PATENT DOCUMENTS

| | | |
|---|---|---|
| 2005/0195802 A1* | 9/2005 | Klein .................. H04L 12/6418 370/352 |
| 2005/0249225 A1* | 11/2005 | Singhal ............... H04L 63/0236 370/401 |
| 2006/0080554 A1 | 4/2006 | McDonald et al. |
| 2008/0247344 A1* | 10/2008 | Bahl .................. H04W 52/0274 370/310 |
| 2013/0102274 A1 | 4/2013 | Lauwaert |
| 2015/0237201 A1 | 8/2015 | Feltham et al. |
| 2015/0281450 A1* | 10/2015 | Shapiro ............... H04M 3/4878 379/265.09 |

* cited by examiner

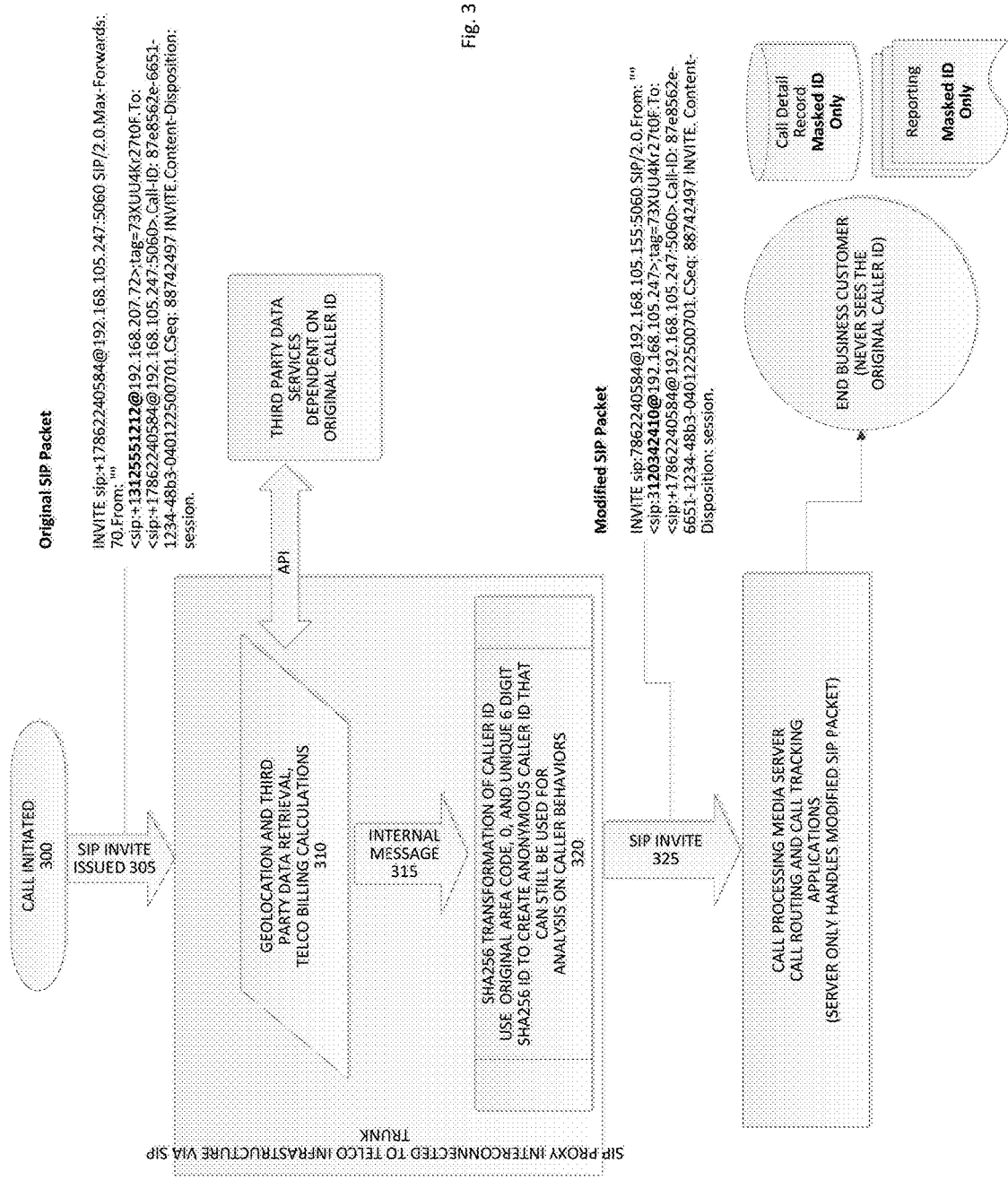

SYSTEM, METHOD, AND COMPUTER PROGRAM PRODUCT FOR CALL TRACKING USING CALLER IDENTIFICATION IN CROSS-CHANNEL MARKETING AUTOMATION MANAGEMENT SUPPORT WITH INTELLIGENT PRIVACY PROTECTION

PRIORITY CLAIM

This patent application claims priority to and benefit of U.S. Provisional Patent Application No. 62/311,090 filed on 21 Mar. 2016, the disclosure of which is now expressly incorporated herein by reference.

FIELD

Disclosed embodiments relate generally to Marketing Automation Management (MA), and more particularly to a system, methods, and computer program products providing or supporting a cross-channel MA support system that perform call tracking using caller identification technology while providing intelligent privacy protection to protect personal information such as the caller's phone number.

BACKGROUND

PII or Sensitive Personal Information (SPI), in privacy and information security law, refers to information that can be used on its own, or with other information, to identify, contact, or locate a person.

NIST Special Publication 800-122 defines PII as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information." NIST also directs that, for the express purpose of distinguishing individual identity, clearly classify a person's full name, home address, email address (if private from an association/club membership, etc.), IP address (when linked, but not PII by itself in US) and telephone number as examples of PII.

Under such a definition, a user's IP address is not PII but can be "linked PII," a "quasi identifier" or a "pseudo-identifier," when it is combined with other information and the combination serves to enable identification, contact or location of a person.

The gathering of PII by organizations via Internet use as well as breaches of Internet security, network security and web browser security has become wide spread. That collection, though not always used for criminal activity, can be used for such ends. As a result, various laws and regulations have been placed on gathering and use of such PII in countries around the world.

One of the primary focuses of the Health Insurance Portability and Accountability Act (HIPAA), is to protect a patient's Protected Health Information (PHI), which is similar to PII (or may be theoretically considered to be included in PII). Additionally, various states in the United States have privacy laws regarding protection of PII and/or personal information. Likewise, various other countries have their own versions of privacy and data protection laws including Australia, the European Union and Canada.

SUMMARY

Accordingly, various disclosed embodiments provide a system, methods, and computer program products for performing call tracking in a novel way wherein caller ID data is obfuscated so as to preserve a caller's privacy by protecting their telephone number.

BRIEF DESCRIPTION OF THE DRAWINGS

FIG. 3 illustrates an example of a methodology performed in accordance with a disclosed embodiment to anonymize caller id data as part of call tracking.

DETAILED DESCRIPTION OF THE EMBODIMENTS

Figure 1:
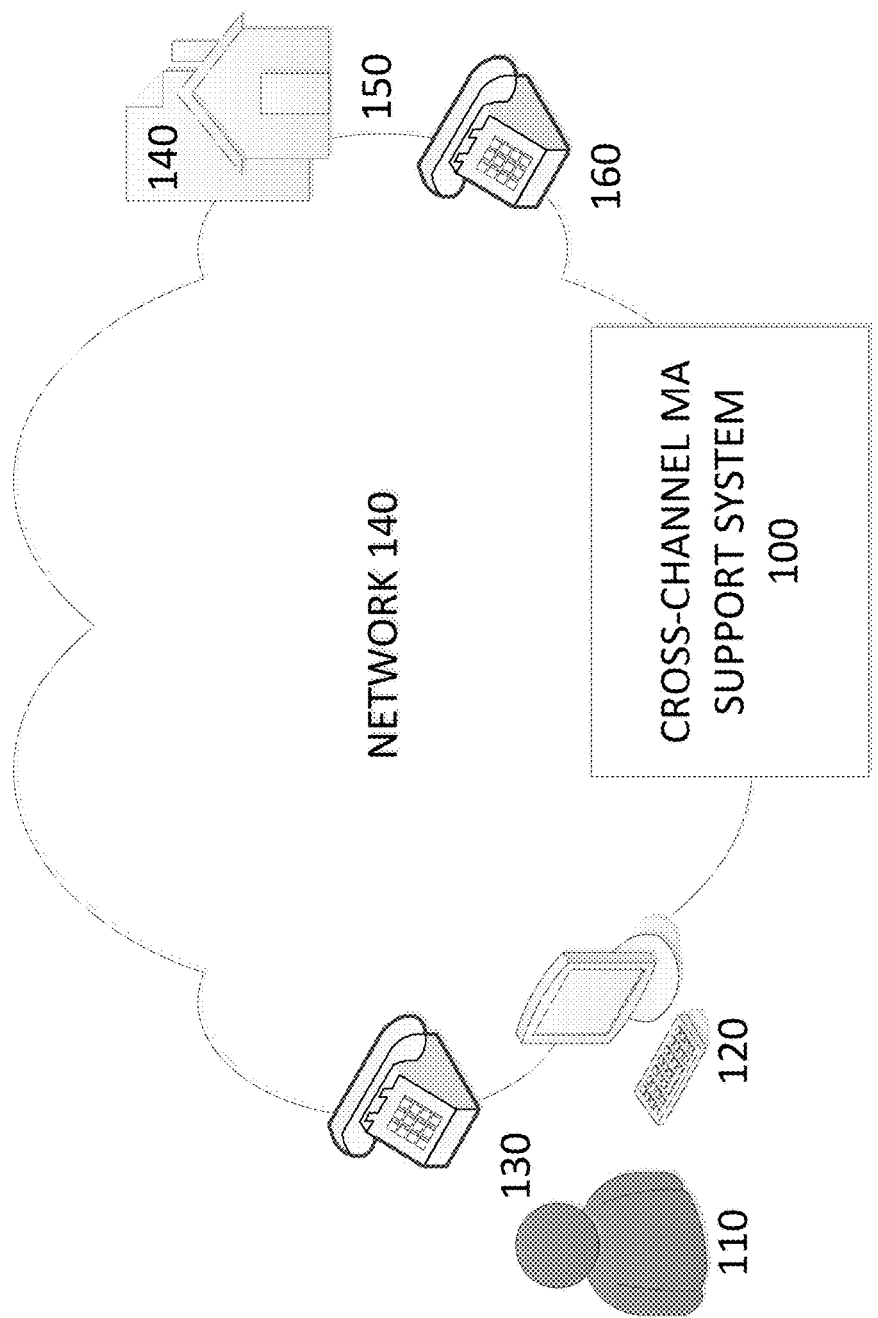
FIG. 1 illustrates a simplified block diagram of a cross-channel MA support system in conjunction with other components according to one disclosed embodiment.

In the field of on-line MA and cross-channel, companies with web-presences (or marketing agencies working on their behalf) use identifiers in combination with key words to direct visitors to their web sites, track their behavior on the Internet and, in turn, generate revenue. Such identifiers include cookies, e.g., an HTTP cookie (also referred to as a web cookie, Internet cookie, browser cookie or cookie), that is implemented as a small piece of data sent from a website and stored in the user's web browser while the user is browsing. The use of such cookies enables a server to maintain or remember stateful information (e.g., remember passwords, content and shopping cart items)) and also to enable recordation and monitoring of a user's browsing activity. Cookies can also store content a user has previously entered into a field on a website, e.g., user information including passwords, credit card numbers, and home or shipping addresses.

With this understanding in mind, it should be understood that cookies, and other Internet tracking technology can be a significant source of PII while providing information indicating a web site's referral, i.e., one of the various paths to a particular web site via other web sites on the Internet and search engines.

Note there may be, conceptually, many referrals for a client web site or web page. Likewise, the term "funnel" has come to conventionally mean a set route of web pages that users must go through to get to a particular page on a web site. Conventionally, various technologies exist for tracking referral data and funnel data; however, these technologies generally rely on sessions or cookies set up with the prospective customer's computer, usually triggered by a user placing items for purchase in a shopping cart at the web site.

Likewise, there are various, conventional MA systems and web analytics systems for "call tracking" (i.e., the counting and gathering of marketing data on incoming voice phone calls that have been generated by a website). Exemplary of such call tracking systems is SourceTrak™, which is available from Dialogtech, Chicago, Ill. and is described in U.S. Ser. No. 13/601,447, filed Aug. 31, 2012, assigned to the assignee of the present invention, and incorporated herein by reference.

Such systems, methods, and computer program products have typically been designed for the purposes of Search Engine Optimization (SEO), assessing a client's return on investment in a Pay-Per-Click (PPC) advertising environment, lead generation, direct marketing, etc.

Other forms of voice call tracking are known in the prior art. For example, the AccuTrack™ line of products and services which are available from Dialogtech and CallTrack® which is available from CallSource, Inc. of Westlake Village, Calif. USA.

Other forms of call tracking use Application Programming Interfaces ("API"). For example, LogMyCalls™, which is available from ContactPoint LLC of St. George, Utah USA, provides a flexible API for users to programmatically manage their account. The MCA platform that is available from Marchex Inc. of Seattle, Wash. USA includes a real-time XML-RPC based API (which Marchex refers to as its "Application Platform Interface") that allows clients to integrate the features and functionality of the MCA platform into their own internal reporting systems, giving great control to how data is presented.

Additionally, conventionally available call tracking systems from Dialogtech also can provide a cross-channel MA support system that serves contact phone numbers for display at a web site and uses such numbers to track, analyze and utilize prospective customer behavior on the Internet prior to the prospective customer calling the served contact phone number. See U.S. patent application Ser. No. 14/228,789, filed Mar. 28, 2014, and incorporated herein by reference in its entirety. That technology enables tracking prospective customers' referral or funnel activity as it matures into a voice call to a contact phone number requesting services. As a result, that technology enables identification and analysis of prospective customers' web-based behavior with a subsequent call to a contact phone number listed on a visited client's web site.

That technology also enables tracked data to be aggregated with data provided by the client web site and/or a third party's analytics software so that the client can not only make informed call routing decisions, but also determine the value of certain bid upon key words over a period of time as well as the lifetime value of keywords based on account revenue. This data aggregation is based at least in part on the ability to map data associated with a voice call to a contact phone number into a format that may be aggregated with data conventionally obtained by such analytics software.

However, as a result of the perceived, and/or actual need for maintaining certain information in a private or secured way, it may be advantageous to eliminate certain information from the aggregated data so as to maintain some level of privacy. For example, it may be advantageous to eliminate a calling number identification from the aggregated data so as to eliminate or reduce the possibility of running afoul of privacy and data security regulations in the United States and around the world at this time and in the future.

For example, as mentioned above, a caller's telephone number has been identified as one example of PII. As a result, the U.S. Federal Communications Commission (FCC) presently has caller ID rules that require telephone companies to enable processes for consumers to prevent their telephone number from being transmitted to called parties that subscribe to caller ID service. Thus, it is foreseeable that stricter regulations in the future may impose limits on gathering caller ID data, for example, at call centers.

Call tracking systems such as the ones discussed above all utilize Caller ID (also known as caller identification or CID), Calling Line IDentification (CLID), Calling Number Delivery (CND), Calling Number IDentification (CNID) or Calling Line Identification Presentation (CLIP), which transmits a caller's number to the called party's telephone equipment during the ringing signal, or during call set up. Conventionally, caller ID can also provide a name associated with the calling telephone number (CNAM). Conventionally available technology can log CLID information and, accordingly, CLID information has been used by conventional call tracking systems. Additionally, presently, it is known to use CLID data in MA systems and other call centers to more effectively route incoming calls to perform balancing between call center locations.

However, there is a foreseeable risk that CLID data, when tracked in combination with other information obtained via monitoring of a user's Internet usage and mapped through the use of served 1-800 numbers could be perceived to provide sufficient information to qualify as PII, either now or in the future, in the United States or somewhere else around the world, and, thus, be subject to privacy related regulations and laws, privacy policies for companies running web-sites in association with call centers, MA systems, etc.

Indeed, in order to address the need for privacy, some organizations are requiring that their business partners, e.g., vendors, etc., agree to certain privacy policies with regard to PII, in particular PHI, protected under HIPPA. As a result, it is not becoming more common for such organizations to require that their business partners sign agreements dictating that, when using or disclosing Protected Health Information, those business partners make "reasonable" efforts to limit Protected Health Information to the minimum necessary to accomplish the intended purpose of the use, disclosure, or request.

Nevertheless, these organizations still would like to gain value from the use of call tracking, which conventionally uses caller ID data that provides the phone number of a calling party.

Accordingly, disclosed embodiments perform call tracking in a novel way wherein caller ID data is obfuscated so as to preserve a caller's privacy by protecting their telephone number.

Referring now to the drawings, wherein like reference numerals and characters represent like or corresponding parts and steps throughout each of the many views, there is shown in FIG. 1, a simplified block diagram of a cross-channel MA support system 100 for tracking a prospective customer's web-based activity and mapping that activity to a contact phone number displayed on a client's web site and potentially used by the prospective customer to contact the client to obtain the client's services.

As shown in FIG. 1, the cross-channel MA support system 100 is configured to support interactions between of a prospective customer 110 with a client's web site 200 over a communication network 140. It should be understood that the communication network 140 may include more than one network and more than one type of network. Thus, by use of the term "network", it should be understood that the foregoing is not intended to limit the present invention to any particular wireline or wireless network, such as Local Area Networks (LANs), Metropolitan Area Networks (MANs), Wide Area Networks (WANs), a Public Switched Telephone Network (PSTN), or combinations thereof. Thus, the network 140 may simply comprise the Internet (also known as the "Web" or "World Wide Web"), but it may similarly comprise intranets, extranets, virtual private networks (VPNs), and the like.

The communication network 140 may be thought of as having more than one communication channel Thus, the prospective customer 110 may communicate with the client in at least two channels: at the client's web site 200 via the Internet and via a voice call over one or more telephone networks to a contact phone system 160 for the client 150, both networks being encompassed in the communication network 140. Accordingly, the prospective customer 110 may communicate with the client 150 via a computer 120 at the client's web site 200 or via a phone 130 by calling the phone number(s) listed on the client's web site 200 to contact the client.

The cross-channel MA support system 100 can be requested to interject itself into communication between the prospective customer 110 and the client's web site 200 by dynamically serving an individualized contact phone number for insertion into a web page included in the web site 200, as viewed by the prospective customer 110.

Figure 2:
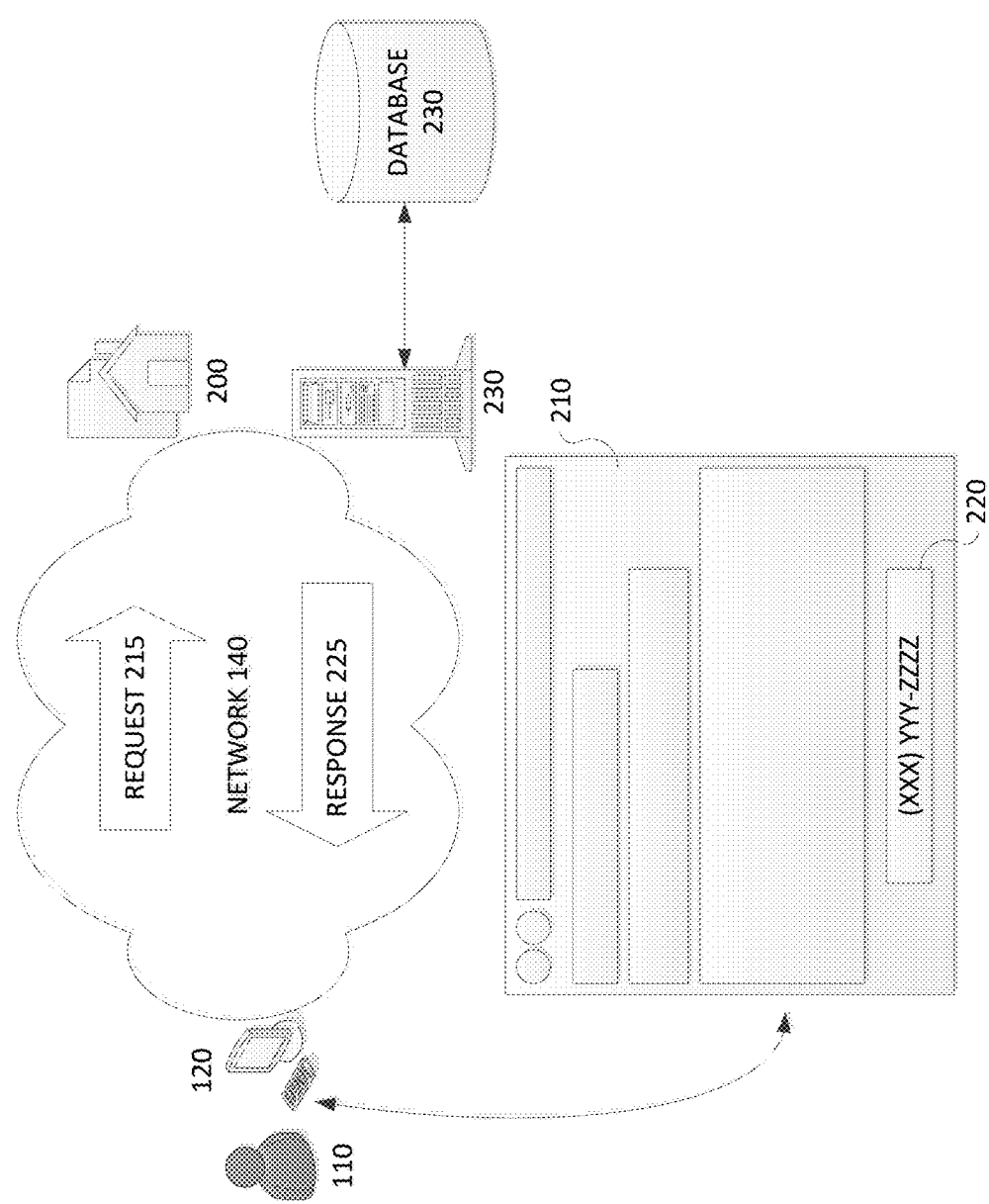
FIG. 2 illustrates simplified block diagram illustrative of the interaction of a prospective customer with the cross-channel MA support system and a client web site, wherein phone numbers are dynamically inserted into a web page(s) at the client web site and based on various web-based activity and collected referral and funnel data for the prospective customer.

Thus, as shown in FIG. 2, a user 110 may access one or more web pages 210 at a client's web site 200 via a computer 120 (e.g., conventional personal computers, workstations, tablet computers, as well as Web-enabled hand-held devices, smart phones, and Internet appliances, etc.) to obtain information about the products/services offered by the client. As the prospective customer 110 navigates the Internet, the prospective customer generates referral data that may be collected in various conventionally known ways described above. Likewise, as the prospective customer generates funnel data as the prospective customer 110 navigates the pages of the client web site 200. Based on that data, which is indicative of the prospective customer's web-based activity and particular interest, the user 110 is presented with a displayed contact phone number 220 on the client's web site that may be called to obtain additional information, schedule an appointment and/or speak with a representative of the client.

That contact phone number 220 may be dynamically inserted into the web page 210 of the web site 200 using script running on the web page 210 that makes a request 215 to a server 230 of the cross-channel MA support system 100. Assuming the request is properly formatted, a contact phone number (XXX) YYY-ZZZZ may be selected and retrieved from database 230 by the server 230, and included in the web page 210 served to the prospective customer's computer 120 in a response 225 over the network 140, and displayed on web page 210 in the designated position 220.

Accordingly, based on the contents of the request 215, the cross-channel MA support system server 230 issues a response 225 that includes a contact phone number to be inserted at the client web page 210 to be viewed by a specific prospective customer 110.

Thus, the voice call number for display may be selected to be specific to a particular prospective customer visiting the client's web site. Alternatively, the contact phone number may be selected to be specific to a particular advertisement campaign or a particular advertisement for the client displayed to the prospective customer, e.g., a PPC advertisement. Regardless, referral and funnel data may be analyzed to determine which contact phone number should be inserted at the client's web site to enable the ability to access and analyze the referral and/or funnel data, intelligently route the incoming call and utilize that data to improve the caller's experience during the voice call. This data may be stored, analyzed, and/or some portion or all of it may be provided to personnel answering the call to the displayed phone number. Such functionality is particularly useful to pre-inform that personnel about the call and the caller and enable the personnel to follow a pre-defined script for handling the call. Additionally, that data may be utilized to intelligently route the call to specific personnel that may have training or skills that enable them to handle the call effectively.

FIG. 3 illustrates an example of a methodology performed in accordance with a disclosed embodiment to anonymize caller id data as part of call tracking. As illustrated in FIG. 3, when the user calls that contact phone number, a call is initiated at 300 by operations at 305, e.g., by issuance of a Session Initiation Protocol (SIP) invite. That SIP invite is sent to a SIP proxy interconnected with the telecommunications infrastructure via a SIP trunk. Operations then proceed to 310 at which geolocation and third party data are retrieved and telecommunications infrastructure billing calculations are performed. These operations may be performed via one or more Application Protocol Interfaces (APIs) that conventionally interact with various third party data services and are dependent on caller ID data transmitted in the SIP invite, e.g., SIP:+13122551212@.

Subsequently, an internal message is issued at 315 triggering application of one way encryption, which is a destructive algorithm, to anonymize the caller ID data. This may be performed at 320, for example (but without limitation), by performing a Secure Hash Algorithm (SHA) 256 transformation of the caller ID. SHA is just one of a number of cryptographic hash functions that may utilized to one way encrypt the caller ID data. SHA-256 algorithm generates an almost-unique, fixed size 256-bit (32-byte) hash. Because SHA is a one way function, it cannot be decrypted back to the original caller ID data.

To ensure that encryption does not generate another seven digit number that is an actual phone number, the digits may be intelligently replaced to produce an unusable string of digits. For example, when implementing the inventive concept in North America, in one implementation (by way of example only) the original area code (also called the Numbering Plan Area number) may be maintained but the first digit of the NXX, is changed to 0. For the purposes of this disclosure means the basic number format used for both NPA (area code) and NXX (exchange) numbers in North America. In NXX numbers, N may be 2-9, while X may be 0-9. Thus, in an NXX number, the first digit cannot be 0 or 1. (For the purpose of this disclosure, NXX does not refer to the three-digit code that forms the second part of a 10-digit North American phone number (digits 4-6), i.e., the central office code or exchange.

The remaining numbers of the NXX, i.e., the X digits, or last six digits of the NXX number, are subject to the SHA 256 transformation to obfuscate the number by one-way encrypting them.

Operations then proceed to 325 at which a SIP invite with the modified caller ID data, e.g., SIP:3120342410@, is included. That modified sip invite is sent to a call processing media server wherein call routing and call tracking applications are running to perform call tracking as that functionality is disclosed in the co-owned patents and patent applications incorporated herein by reference.

In this way, any data used to perform call tracking can be mapped to the modified caller ID data so as to ensure the anonymity of the caller while still performing intelligent caller/customer support functionality as disclosed in the co-owned patents and patent applications incorporated herein by reference. As a result, the MA system's client (e.g., end business customer) is isolated from the caller ID data and insulated from associated privacy protection responsibility and liability.

Therefore, since the caller ID data is replaced in a consistent way, call logging and tracking, and associated data analysis and aggregation can be performed without storing or disclosing a caller's identity. As a result, various pieces of information may be monitored over multiple calls, each associated with the transformed caller ID data, for example, the number of times the caller called, the average call length, routing options, etc.

Thus, in accordance with at least one embodiment, the system and methodologies may enable more intensive analysis for clients (e.g., a called organization), by generating call log data that indicates call frequency while masking the caller ID number for incoming calls to a 1-800 number.

In accordance with at least one embodiment, it is possible to broadly geo locate the call before masking the caller id and save the "general caller area" and then mask the call. This would preserve the ability to protect privacy while still providing geo analysis within an area code.

In accordance with at least one embodiment, the area code of the call may also be obfuscated using one-way encryption.

Exemplary embodiments have been discussed in detail herein. While specific exemplary embodiments have been discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatus/systems for performing the operations disclosed herein. An apparatus/system may be specially constructed for the desired purposes, or it may comprise a general purpose apparatus/system selectively activated or reconfigured by a program stored in the apparatus/system.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM), random access memory (RAM), magnetic disk storage media, optical storage media, flash memory devices including thumb drives and solid state drives, and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Further, the term computer readable medium is meant to refer to any machine-readable medium (automated data medium) capable of storing data in a format readable by a mechanical device. Examples of computer-readable media include magnetic media such as magnetic disks, cards, tapes, and drums, punched cards and paper tapes, optical disks, barcodes and magnetic ink characters. Further, computer readable and/or writable media may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc.).

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

For example, disclosed embodiments have been explained in the context of a Voice over IP (VoIP) implementation. However, it is foreseeable that the disclosed embodiments may have technical utility in the context of other technologies using networks other than packet-switched data networks.

What is claimed is:

1. A cross-channel marketing automation management support system that serves contact phone numbers for display at a client web site and uses the numbers to match web-based activity of a prospective customer with a voice call to one of the served contact phone numbers, the system comprising:

at least one database including the contact phone numbers organized into pools of available contact phone numbers for insertion on a page of the client web site; and at least one server coupled to the at least one database and running software that selects one of the contact phone numbers from one pool of available contact phone numbers for insertion on the page of the client web site based on data indicating the prospective customer's web-based activity that is sent to the at least one server as a result of the prospective customer's computer requesting the page of the client web site while visiting the client web site, wherein the prospective customer's web-based activity is matched up with the voice call to the one of the served contact phone numbers to associate the web-based activity and voice call activity of the prospective customer with each other, and wherein caller ID data for the voice call is one way encrypted to generate modified caller ID data that is used to associate the web-based activity and the voice call activity.

2. The system of claim 1, wherein the modified caller ID data comprises an obfuscated Numbering Plan Area number.

3. The system of claim 2, wherein the modified caller ID data comprises an obfuscated area code.

4. The system of claim 3, wherein the system identifies geo-location data prior to the one way encryption and stores the geo-location data with the modified caller ID data.

5. The system of claim 1, wherein the system performs one way encryption in a consistent manner across all incoming voice calls.

6. The system of claim 1, wherein the system generates a modified caller ID data that is not a useable phone number.

7. The system of claim 1, wherein system generates call log data for the modified caller ID data that indicates call frequency.

8. The system of claim 1, wherein the system performs a Secure Hash Algorithm (SHA) transformation to generate the modified caller ID data.

9. A method for anonymizing caller ID data during call tracking, the method comprising:
   initiating a call using a contact phone number;
   retrieving one or more of geo-location and third party data related to the initiated call based on caller ID data transmitted in the initiation:
   anonymizing the initiated call by one way encrypting the caller ID data creating modified caller ID data; and
   sending the modified caller ID data to a call processing media server to route the modified caller ID data and the initiated call to a contact phone number destination.

10. The method of claim 9, wherein the modified caller ID data comprises an obfuscated Numbering Plan Area number.

11. The method of claim 9, wherein the modified caller ID data comprises an obfuscated area code.

12. The method of claim 9, wherein the one way encryption is performed in a consistent manner across all incoming voice calls.

13. The method of claim 9, wherein the modified caller ID data is not a useable phone number.

14. The method of claim 9, further comprising generating call log data for the modified caller ID data that indicates call frequency.

15. The method of claim 9, wherein a Secure Hash Algorithm (SHA) transformation is performed to generate the modified caller ID data.

16. A cross-channel marketing automation management support system that consistently generates trackable modified caller IDs while maintaining caller privacy, the system comprising:
   a server that accepts incoming calls with a trackable contact number that has been issued to an incoming caller based on a web-based activity of the incoming caller,
   the server further configured to transform a caller ID of the incoming caller via one-way encryption to generate modified caller ID data and to route the incoming calls with the modified caller ID data to a call processing media server to route and track the incoming calls.

17. The system of claim 16, wherein the call processing media server is configured to only receive the modified caller ID data.

18. The system of claim 16, wherein the server performs a Secure Hash Algorithm (SHA) transformation to generate the modified caller ID data.

19. The system of claim 16, wherein the modified caller ID data comprises an obfuscated Numbering Plan Area number.

20. The system of claim 17, wherein the modified caller ID data comprises an obfuscated area code.

* * * * *